United States Patent
Lamarre

(10) Patent No.: US 9,541,005 B2
(45) Date of Patent: Jan. 10, 2017

(54) ADAPTIVE FUEL MANIFOLD FILLING FUNCTION FOR IMPROVED ENGINE START

(71) Applicant: PRATT & WHITNEY CANADA CORP., Longueuil (CA)

(72) Inventor: Sylvain Lamarre, Boucherville (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 541 days.

(21) Appl. No.: 13/630,679

(22) Filed: Sep. 28, 2012

(65) Prior Publication Data
US 2014/0095051 A1    Apr. 3, 2014

(51) Int. Cl.
  B60T 7/12     (2006.01)
  F02C 7/26     (2006.01)
  F02C 9/28     (2006.01)

(52) U.S. Cl.
  CPC .. F02C 7/26 (2013.01); F02C 9/28 (2013.01)

(58) Field of Classification Search
  CPC ............ F02M 63/0225; F02M 37/0029; F02M 63/023; F02D 41/3845; F02D 2200/0602; F02D 2250/31; F02D 41/3082; F02D 19/0605
  USPC ... 123/446, 447; 701/102–105; 60/778, 786, 60/788, 790, 39.13, 39.281
  See application file for complete search history.

(56) References Cited

U.S. PATENT DOCUMENTS

| | | | | |
|---|---|---|---|---|
| 2,880,790 A | * | 4/1959 | Mock | F02C 7/26 137/613 |
| 3,967,598 A | * | 7/1976 | Rachel | F02D 41/3082 123/179.17 |
| 4,627,234 A | * | 12/1986 | Schuh | F02C 3/085 60/39.281 |
| 4,711,085 A | * | 12/1987 | Lyons | F02C 7/228 60/739 |
| 4,712,528 A | * | 12/1987 | Schaffitz | F02M 51/0671 123/446 |
| 4,815,278 A | * | 3/1989 | White | F02C 9/30 417/42 |
| 4,901,701 A | * | 2/1990 | Chasteen | F02D 37/02 123/478 |
| 4,922,710 A | * | 5/1990 | Rowen | F02C 3/22 60/39.281 |
| 5,020,314 A | * | 6/1991 | Brophy | F02C 9/36 60/734 |
| 5,065,716 A | * | 11/1991 | Nakagawa | F02D 41/047 123/326 |
| 5,107,674 A | * | 4/1992 | Wibbelsman | F02C 7/26 60/778 |
| 5,174,264 A | * | 12/1992 | Matsuoka | F02D 41/182 123/488 |
| 5,175,994 A | * | 1/1993 | Fox | F23K 5/005 60/39.58 |

(Continued)

Primary Examiner — Joseph Dallo
(74) Attorney, Agent, or Firm — Norton Rose Fulbright Canada

(57) ABSTRACT

There is described a system and method for filling an engine fuel manifold. An adaptive filling function is used to determine a flow rate at which fuel is to be delivered to the fuel manifold. The filling function receives as an input a present measurement of the engine's speed and computes the flow rate accordingly. The fuel manifold may then be filled according to the computed flow rate so as to match the engine's speed. Appropriate fuel/air ration conditions can therefore be achieved for successful engine start.

19 Claims, 7 Drawing Sheets

(56) References Cited

U.S. PATENT DOCUMENTS

| | | | | |
|---|---|---|---|---|
| 5,274,996 A * | 1/1994 | Goff | | F02C 7/262 |
| | | | | 60/39.281 |
| 5,528,897 A * | 6/1996 | Halin | | F02C 7/232 |
| | | | | 60/39.094 |
| 5,609,016 A * | 3/1997 | Yamada | | F02C 3/22 |
| | | | | 60/39.281 |
| 5,642,716 A * | 7/1997 | Ricco | | F02D 41/3809 |
| | | | | 123/447 |
| 5,749,344 A * | 5/1998 | Yoshiume | | F02D 41/3082 |
| | | | | 123/399 |
| 5,966,925 A * | 10/1999 | Torikai | | F02C 7/26 |
| | | | | 60/778 |
| 6,092,509 A * | 7/2000 | Tanabe | | F02D 41/3827 |
| | | | | 123/447 |
| 6,182,438 B1 * | 2/2001 | Weber | | F02C 9/28 |
| | | | | 60/778 |
| 6,321,525 B1 * | 11/2001 | Rogers | | F01D 17/06 |
| | | | | 60/39.281 |
| 6,357,219 B1 * | 3/2002 | Dudd, Jr. | | F02C 7/26 |
| | | | | 60/39.281 |
| 6,786,049 B2 * | 9/2004 | Parsons | | F23K 5/06 |
| | | | | 60/39.281 |
| 6,810,676 B2 * | 11/2004 | O'Connor | | F02C 7/26 |
| | | | | 60/778 |
| 7,000,405 B2 * | 2/2006 | McKelvey | | F02C 9/26 |
| | | | | 60/39.281 |
| 7,003,939 B1 * | 2/2006 | Rackwitz | | F23R 3/346 |
| | | | | 60/734 |
| 7,010,399 B2 * | 3/2006 | Rupe | | B64D 37/28 |
| | | | | 60/39.281 |
| 7,093,443 B2 * | 8/2006 | McKelvey | | F01D 15/10 |
| | | | | 60/39.281 |
| 7,143,576 B2 * | 12/2006 | Oono | | F02D 41/3845 |
| | | | | 123/447 |
| 7,168,254 B2 * | 1/2007 | Riley | | F02C 7/26 |
| | | | | 60/39.281 |
| 7,386,982 B2 * | 6/2008 | Runkle | | F02C 7/26 |
| | | | | 60/39.094 |
| 7,509,812 B2 * | 3/2009 | Mehrer | | F02C 7/264 |
| | | | | 60/39.821 |
| 7,530,232 B2 * | 5/2009 | Certain | | F02C 9/28 |
| | | | | 60/39.281 |
| 7,540,141 B2 * | 6/2009 | Goldberg | | F02C 7/22 |
| | | | | 60/39.281 |
| 7,841,184 B2 * | 11/2010 | Dooley | | F02C 7/222 |
| | | | | 60/733 |
| 7,938,101 B2 * | 5/2011 | Cinpinski | | F02D 41/2467 |
| | | | | 123/446 |
| 8,286,414 B2 * | 10/2012 | Gallagher | | F02C 9/28 |
| | | | | 60/39.281 |
| 2001/0006061 A1 * | 7/2001 | Shimada | | F02D 41/062 |
| | | | | 123/495 |
| 2005/0011197 A1 * | 1/2005 | Tuttle | | F02C 7/22 |
| | | | | 60/773 |
| 2006/0030450 A1 * | 2/2006 | Kyle | | B60K 6/26 |
| | | | | 477/3 |
| 2006/0254282 A1 * | 11/2006 | Riley | | F02C 7/26 |
| | | | | 60/773 |
| 2007/0034191 A1 * | 2/2007 | Oono | | F02D 41/3845 |
| | | | | 123/456 |
| 2007/0130911 A1 * | 6/2007 | Goldberg | | F02C 7/22 |
| | | | | 60/39.281 |
| 2008/0035118 A1 * | 2/2008 | Toyohara | | F02D 41/3836 |
| | | | | 123/478 |
| 2008/0109152 A1 * | 5/2008 | Puckett | | F02D 41/3845 |
| | | | | 701/115 |
| 2008/0196405 A1 * | 8/2008 | Buis | | F02B 37/24 |
| | | | | 60/602 |
| 2008/0271461 A1 * | 11/2008 | Terlecki | | F01D 19/00 |
| | | | | 60/790 |
| 2009/0071442 A1 * | 3/2009 | Emo | | F02C 7/20 |
| | | | | 123/446 |
| 2009/0145105 A1 * | 6/2009 | Suciu | | F01D 5/022 |
| | | | | 60/39.281 |
| 2009/0234555 A1 * | 9/2009 | Williams | | F23N 1/002 |
| | | | | 701/100 |
| 2010/0044129 A1 * | 2/2010 | Kyle | | B60K 6/26 |
| | | | | 180/65.25 |
| 2010/0050593 A1 * | 3/2010 | Futa | | F02C 7/228 |
| | | | | 60/39.094 |
| 2010/0126136 A1 * | 5/2010 | Anson | | F02C 7/22 |
| | | | | 60/39.281 |
| 2010/0199681 A1 * | 8/2010 | Dooley | | F01D 21/06 |
| | | | | 60/776 |
| 2010/0293960 A1 * | 11/2010 | Davies | | F01D 19/00 |
| | | | | 60/778 |
| 2010/0293961 A1 * | 11/2010 | Tong | | F01D 19/00 |
| | | | | 60/778 |
| 2011/0041510 A1 * | 2/2011 | Sasaki | | F02C 9/28 |
| | | | | 60/776 |
| 2011/0041511 A1 * | 2/2011 | Bradbrook | | F01D 19/00 |
| | | | | 60/778 |
| 2011/0062708 A1 * | 3/2011 | Prochaska | | F02D 29/06 |
| | | | | 290/7 |
| 2011/0094241 A1 * | 4/2011 | Rodd | | F01D 19/00 |
| | | | | 60/778 |
| 2011/0257801 A1 * | 10/2011 | Kumula | | F01D 15/10 |
| | | | | 700/287 |

* cited by examiner

ADAPTIVE FUEL MANIFOLD FILLING FUNCTION FOR IMPROVED ENGINE START

TECHNICAL FIELD

The application relates generally to a system and method for filling an engine fuel manifold.

BACKGROUND OF THE ART

In typical gas turbine engine start systems, a start sequence may be used to coordinate engine speed, ignition, and fuel delivery mechanism to achieve a reliable start. In particular, successful engine start may be obtained within a given range of fuel/air (FAR) ratio capable of sustaining combustion in the engine. As air flow within the engine is a consequence of compressor rotational speed, an appropriate amount of fuel should be sent to the engine combustor at an appropriate speed, i.e. engine speed and fuel delivery should be coordinated, in order to create the proper FAR condition.

Manifold priming however delays the flow of fuel out of the engine's fuel manifold. On the one hand, if the engine has high acceleration and the manifold is not quickly primed, the fuel may be sent to the engine's combustor too late. This may result in an excessively poor fuel/air mixture, which may be too lean to produce engine light-up. On the other hand, if the engine has low acceleration, the fuel manifold is likely to be primed more quickly. The fuel may be sent to the engine combustor too quickly, resulting in an excessively rich mixture. In this case, although light-up is likely to be produced, extreme temperature and flames may result, leading to accelerated engine deterioration.

There is therefore a need for an improved system and method for filling an engine fuel manifold.

SUMMARY

In one aspect, there is provided a system for filling a fuel manifold of an engine, the system comprising a memory, a receiving unit adapted to receive a present measurement of a speed of the engine, and a processing unit coupled to the memory, the processing unit adapted to compute from the received measurement a flow rate of fuel to be supplied to the fuel manifold for filling thereof and to generate an output signal for causing delivery of the fuel to the fuel manifold according to the computed flow rate.

In another aspect, there is provided a method for filling a fuel manifold of an engine, the method comprising receiving a present measurement of a speed of the engine, computing from the received measurement a flow rate of fuel to be supplied to the fuel manifold for filling thereof, and generating an output signal for causing delivery of the fuel to the fuel manifold according to the computed flow rate.

In a further aspect, there is provided a system for filling a fuel manifold of an engine, the system comprising means for receiving a present measurement of a speed of the engine, means for computing from the received measurement a flow rate of fuel to be supplied to the fuel manifold for filling thereof, and means for generating an output signal for causing delivery of the fuel to the fuel manifold according to the computed flow rate.

DESCRIPTION OF THE DRAWINGS

Reference is now made to the accompanying figures in which.

DETAILED DESCRIPTION

Figure 1:
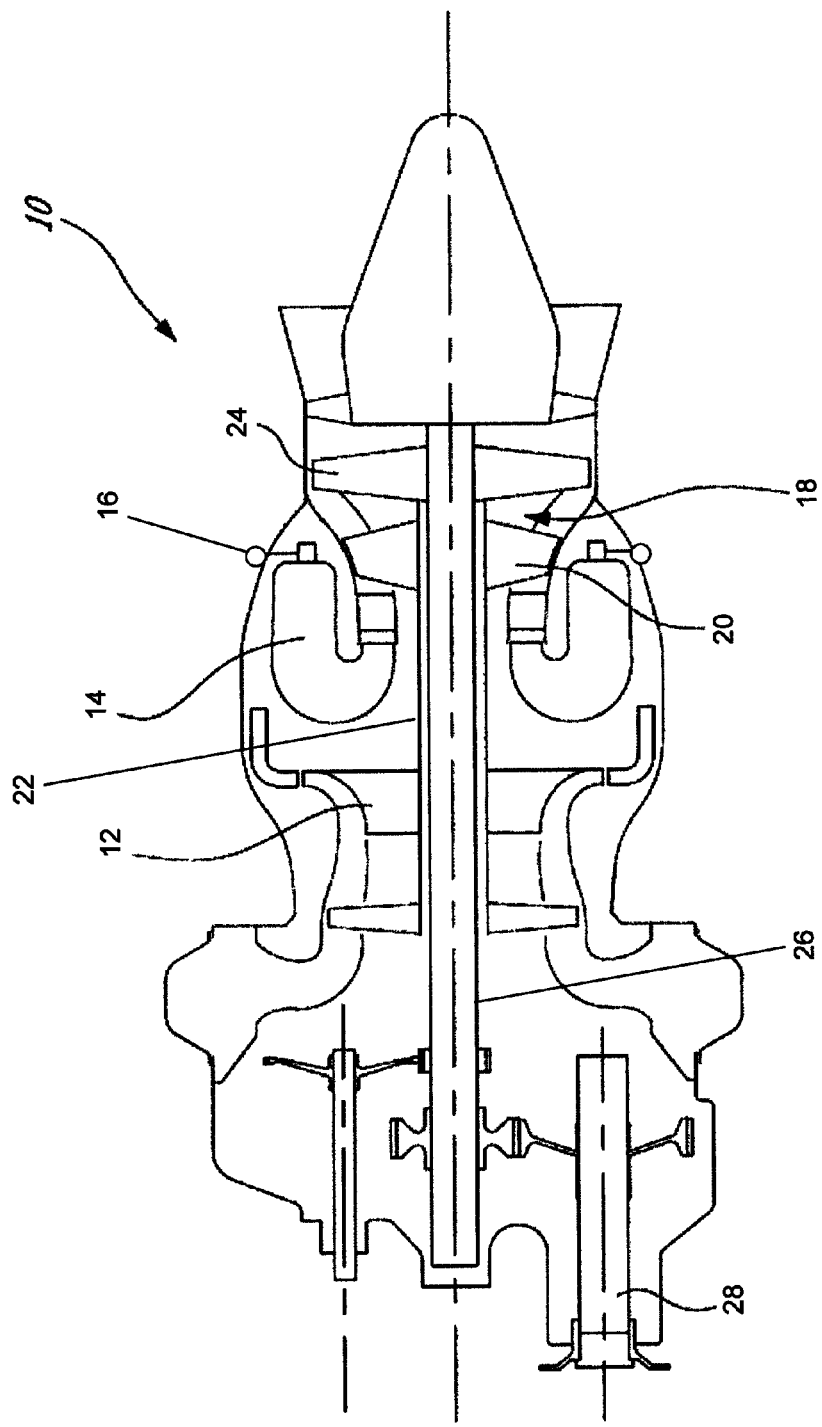
FIG. 1 is a schematic side cross-sectional view of a gas turbine engine.

FIG. 1 illustrates a gas turbine engine 10 of a type preferably provided for use in subsonic flight, generally comprising in serial flow communication, a compressor section 12 for pressurizing the air, a combustor 14 in which the compressed air is mixed with fuel provided by a manifold 16 and ignited for generating an annular stream of hot combustion gases, and a turbine section 18 for extracting energy from the combustion gases. The turbine section 18 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not shown).

Figure 2:
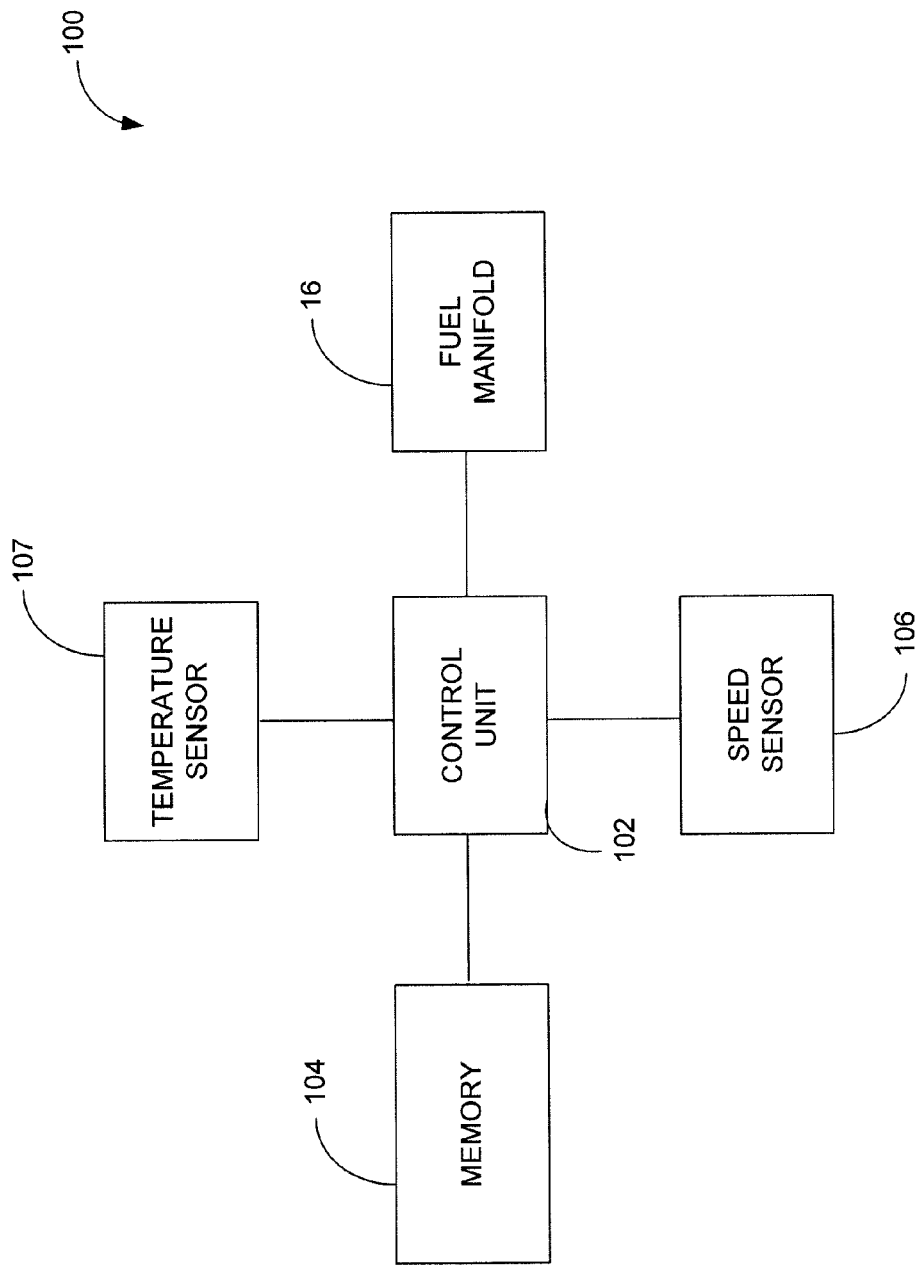
FIG. 2 is a schematic diagram of an adaptive fuel manifold filling system in accordance with an illustrative embodiment.

Referring to FIG. 2, an adaptive fuel manifold filling system 100 will now be described. The system 100 illustratively comprises a control unit 102 controlling the flow of fuel into the fuel manifold 16. The control unit 102 may comprise a digital computer or Engine Control Unit (ECU) (not shown) using a Central Processing Unit (CPU) (not shown). The control unit 102 may further be coupled to storage or memory 104. The memory 104 may be a main memory, such as a high speed Random Access Memory (RAM), or an auxiliary storage unit, such as a hard disk, an erasable programmable read only memory (EPROM), or flash memory (e.g. memory sticks and secure digital (SD) cards). The memory 104 may further be any other type of memory, for example an optical storage media such as a videodisc and a compact disc. One or more databases (not shown) may be integrated directly into the memory 104 or may be provided separately therefrom. The databases may be provided as collections of data or information organized for rapid search and retrieval by a computer. The databases may be structured to facilitate storage, retrieval, modification, and deletion of data in conjunction with various data-processing operations. The databases may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

The control unit 102 may be in communication with the hardware of the engine 10 and receive from at least one speed sensor 106 coupled to the engine 10 measurements of the engine's gas generator speed (Ng). The control unit 102 may also be coupled to a temperature sensor 107 for detecting a light-up condition of the engine 10, as will be discussed further below. According to the received speed measurements, the control unit 102 may be used to control the amount of fuel delivered to the fuel manifold 16 via fuel inlet pipes (not shown). For this purpose, the control unit 102 illustratively uses an adaptive filling function to determine, in accordance with the currently received speed measurement, a suitable rate of fuel flow into the fuel manifold 16. In particular and as discussed further below, the control unit 102 illustratively computes a boosted fuel flow rate that is to be used to fill the fuel manifold 16 for a predetermined duration and/or until engine ignition or light-up is achieved. The filling of the fuel manifold 16 may thus be precisely controlled so as to match the engine's gas generator speed, thereby improving the starting capability of the engine 10. By filling the fuel manifold 16 using the boosted fuel flow rate, the appropriate fuel/air ratio condition can be obtained for successful engine start by sending an appropriate amount of fuel to the engine combustor 14 at the correct compressor rotational speed. As will be discussed further below with reference to FIG. 4, the fuel manifold 16 is illustratively filled using a predetermined open loop schedule in addition to the boosted fuel flow rate determined by implementing the adaptive filling function logic.

Figure 3:
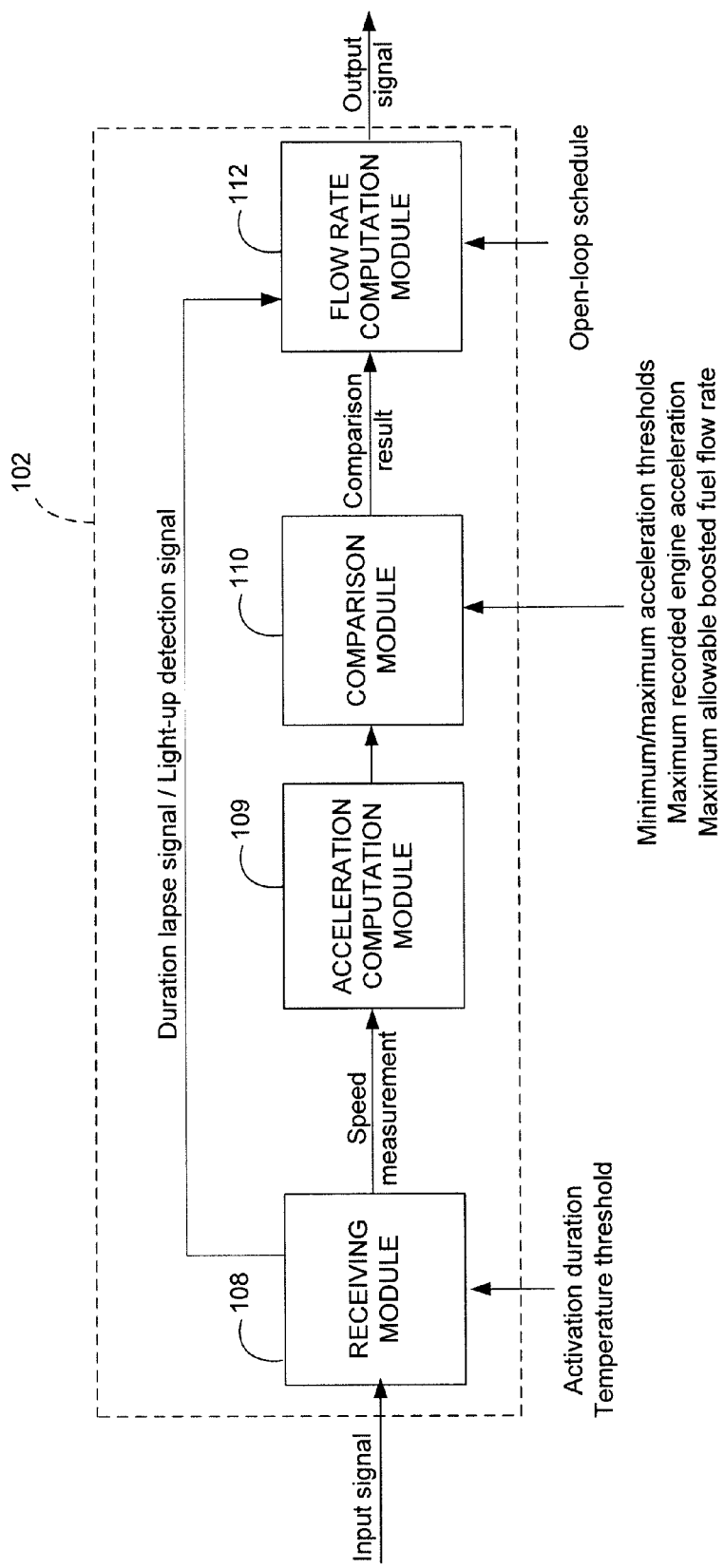
FIG. 3 is a state diagram of an illustrative embodiment of a control unit of FIG. 2.

Referring to FIG. 3, the control unit 102 illustratively comprises a receiving module 108, an acceleration computation module 109, a comparison module 110, and a flow rate computation module 112.

In order to activate the implementation of the filling function, the receiving module 108 may receive an input signal comprising an activation signal indicating that it is desired to enable the filling function. The activation signal may be received from the aircraft command system, i.e. from the pilot. Such an activation signal is illustratively the start signal of the engine 10, such that the filling function may be activated at every start of the engine 10. Further to receiving the activation signal, the receiving module 108 illustratively receives from the speed sensor 106 a measurement of the engine's gas generator speed (Ng). The receiving module 108 may further retrieve from the memory 104 a value of the predetermined duration for which the filling function should be active. The receiving module 108 may then calculate the time that has elapsed between the moment the activation signal has been received and the present time. If the elapsed time is greater than the retrieved activation duration, the receiving module 108 determines that the activation duration has lapsed and that the filling function should no longer be implemented by the control unit 102. The receiving module 108 may then send a duration lapse signal to the flow rate computation module 112. The latter then retrieves a predetermined open-loop schedule from the memory 104 and generate an output signal indicating that fuel is to be supplied to the fuel manifold 16 according to an open-loop fuel flow rate.

If the receiving module 108 determines that the activation duration has not lapsed, the receiving module 108 transmits the speed measurement to the acceleration computation module 109. The acceleration computation module 109 may then compute from the received measurement the change rate of the engine's speed, i.e. the engine's acceleration (N2 dot). The acceleration computation module 109 computes the engine acceleration by taking the derivative of the speed and sends the computed acceleration to the comparison module 110.

The comparison module 110 then compares the received acceleration to a predetermined minimum acceleration threshold and a predetermined maximum acceleration threshold. The thresholds are illustratively stored in the memory 104 and may be retrieved by the comparison module 110 for this purpose. Comparison of the computed acceleration to the threshold enables computation of a multiplier (BWf), which may be used to derive the boosted value of the fuel flow rate (Filling_Wf). Indeed, the comparison module 110 determines whether the engine's acceleration is below the minimum threshold, above the maximum threshold, or between the minimum and the maximum threshold. The comparison result is then sent to the flow rate computation module 112, which determines therefrom the multiplier BWf and accordingly the boosted value of the fuel flow rate.

In particular, the multiplier BWf is illustratively defined as follows:

$$\text{When } N2dot \text{ is below } [\text{min\_threshold}], BWf=0\% \quad (1)$$

$$\text{When } [\text{min\_threshold}] < N2dot < [\text{max\_threshold}],$$
$$BWf=(\text{Max}\_N2dot-[\text{min\_threshold}])/$$
$$([\text{max\_threshold}]-[\text{min\_threshold}]) \quad (2)$$

$$\text{When } N2dot > [\text{max\_threshold}], BWf=100\% \quad (3)$$

where the variable Max_N2 dot corresponds to the maximum engine acceleration value recorded since the beginning of rotation of the engine 10. As discussed above, the engine acceleration is illustratively obtained from the speed measurements received from the speed sensor 106. As such, these measurements may be received periodically from the speed sensor 106 and stored over time in the memory 104 along with the corresponding values of the engine acceleration computed by the acceleration computation module 109. The value of Max_N2 dot may therefore be obtained by searching in the memory 104 for the maximum one of the stored acceleration values.

The variables [max_threshold] and [min_threshold] respectively correspond to the predetermined maximum and minimum acceleration thresholds stored in the memory 104 and retrieved therefrom by the comparison module 110. In one embodiment, the variables [max_threshold] and [min_threshold] may vary as a function of altitude and outside air temperature. For example, at see-level altitude and a temperature of −10 degrees Celsius, the maximum acceleration threshold may have a value of 4.2% Ng/sec while the minimum acceleration threshold may have a value of 3% Ng/sec. When an altitude of 20 kft is reached, the value of the maximum acceleration threshold may then become 5.8% Ng/sec while the value of the minimum acceleration threshold may become 3.4% Ng/sec.

Once the multiplier BWf has been determined on the basis of the comparison result received from the comparison module 110, the flow rate computation module 112 may then compute the value of the boosted fuel flow rate Filling_Wf using the following equation:

$$[\text{Filling\_}Wf]=BWf^*[\text{max\_boost\_}Wf\_\text{value}] \quad (4)$$

where the variable [max_boost_Wf_value] corresponds to the upper limit, i.e. the maximum allowable value, for the boosted fuel flow rate. From equation (4), it can be seen that the boosted fuel flow rate is illustratively computed as a percentage of the maximum allowable boosted fuel flow rate [max_boost_Wf_value]. The value [max_boost_Wf_value] may be predetermined and stored in the memory 104 for subsequent retrieval by the comparison module 110 to compute the boosted fuel flow rate Filling_Wf. In one embodiment, [max_boost_Wf_value] is set to 60 PPH. It should however be understood that other values may apply.

Once the boosted fuel flow rate Filling_Wf has been determined, the flow rate computation module 112 generates an output signal accordingly, the output signal indicative of the boosted fuel flow rate that is to be sent via the fuel inlet pipes to the fuel manifold 16 for filling the latter. Since this boosted fuel flow rate is computed on the basis of the engine's speed received at the control unit 102, the fuel manifold 16 may be filled on time to match the speed of the engine 10 using the adaptive filling function described above. As a result, appropriate fuel/air ratio conditions can be created and successful engine light-up achieved.

Figure 4:
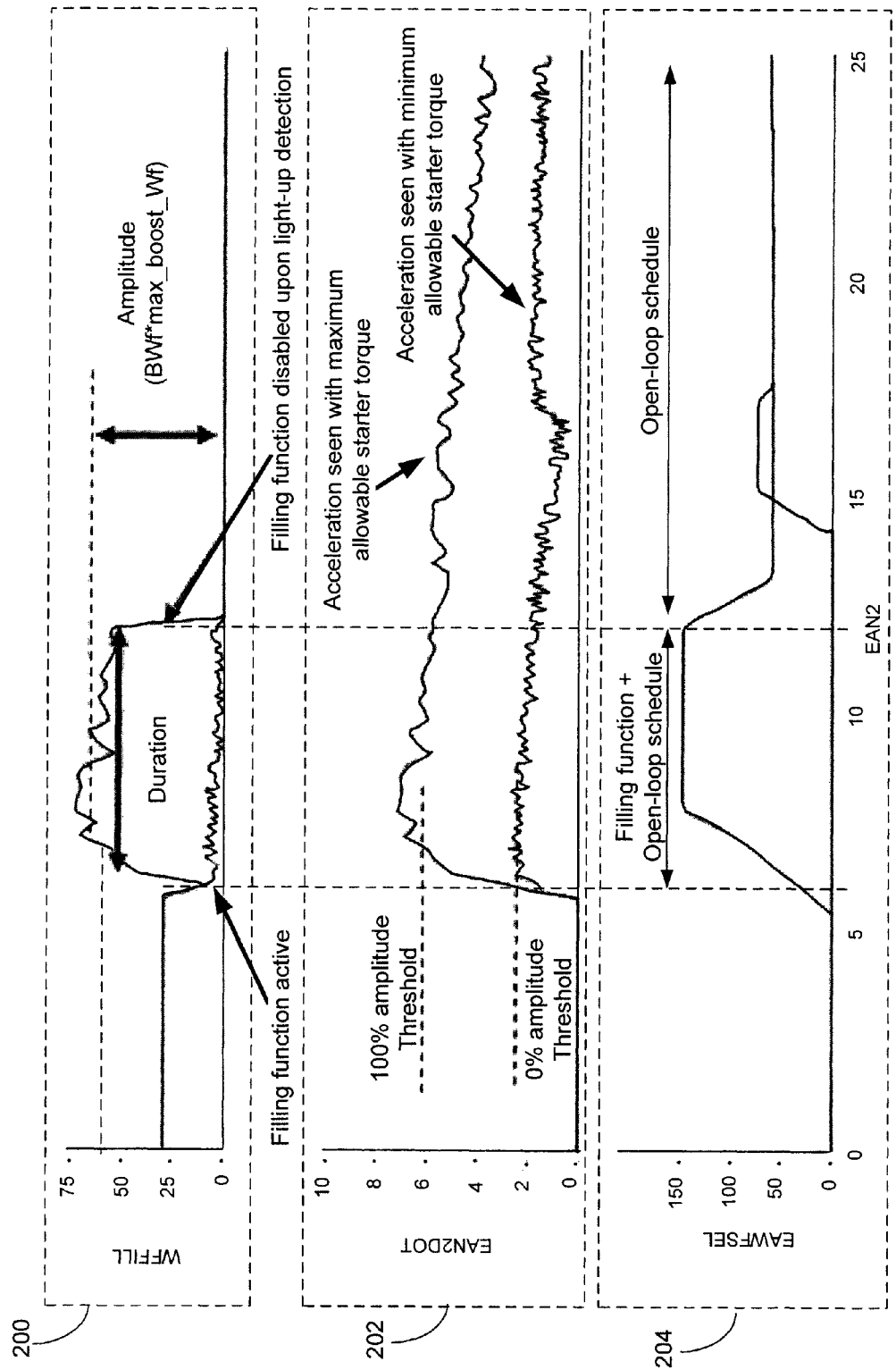
FIG. 4 is a plot of a boosted fuel flow rate computed using the fuel manifold filling system of FIG. 2, an acceleration recorded for the engine of FIG. 1, and an overall fuel flow rate supplied to the engine of FIG. 1 in accordance with an illustrative embodiment.

FIG. 4 illustrates a plot 200 of the fuel flow rate computed upon the control unit 102 implementing the adaptive filling function logic, a plot 202 of the acceleration of the engine 10, and a plot 204 of the overall fuel flow rate supplied to the engine 10 subsequent to implementation of the adaptive filling function logic, all as a function of the speed of the engine 10.

The control unit 102 may implement the adaptive filling function by default. As is apparent from equations (1) to (3) and as can be seen from plot 200, the adaptive filling function may be used to adjust the fuel flow rate as soon as the engine's acceleration (N2 dot) is greater than the minimum acceleration threshold [min_threshold], i.e. the multiplier BWf is non-zero. The adaptive filling function may be enabled for any type of engine start-up. For example, the control unit 102 may implement the adaptive filling function logic prior to or during flight. As discussed above, the adaptive filling function may further be enabled over a fixed duration, e.g. 1.20 seconds, in addition to carrying out the open-loop fuel schedule. Such a schedule may be used to specify a predetermined amount of fuel to be delivered to the fuel manifold 16 for a particular operating condition of the engine 10. The open loop schedule can be used to provide precise fuel injection timing and regulation using a fixed calculation or function developed by careful measurement and data taken from a representative engine 10. As discussed above, the open-loop schedule may be stored in the memory 104 and retrieved therefrom by the flow rate computation module 112 of the control unit 102 in order to determine the fuel flow rate to be delivered to the fuel manifold 16 according to the schedule.

Referring back to FIG. 3 in addition to FIG. 4, the control unit 102 may further disable the adaptive filling function upon the detection of engine light-up. Such detection may, for example, be accomplished by the control unit 102 checking an output signal generated by the temperature sensor (reference 107 in FIG. 2) capable of detecting exhaust gas temperature. The signal output by the temperature sensor 107 illustratively comprises an exhaust gas temperature measurement and may be received at the receiving module 108 of the control unit 102. The receiving module 108 may then determine from the received signal, i.e. the temperature measurement, whether engine light-up has occurred. For example, this may be effected by comparing the received temperature measurement to a temperature threshold retrieved from the memory 104. It should be understood that light-up detection may be effected in a variety of other ways known to those skilled in the art. Once the receiving module 108 determines that light-up has occurred, a light-up detection signal may be transmitted to the flow rate computation module 112, which will determine the appropriate fuel flow rate to be delivered to the fuel manifold 16.

In particular, if light-up is detected after the lapse of the fixed duration during which the filling function is enabled, the control unit 102 has illustratively already automatically returned to the open-loop schedule at the time the light-up is detected. Indeed, in this case, a duration lapse signal has illustratively already been received at the flow rate computation module 112 prior to receiving the light-up detection signal. As discussed above, upon receiving the duration lapse signal, the flow rate computation module 112 will illustratively have retrieved the open-loop schedule from the memory 104 and generated an output signal indicating that the fuel flow rate sent to the fuel manifold 16 is to follow the retrieved open-loop schedule. Upon subsequently receiving the light-up detection signal from the receiving module 108, the flow rate computation module 112 may then determine that the current fuel flow rate already follows the previously retrieved open-loop schedule and no additional action needs to be taken to adjust the fuel flow rate. Otherwise, if light-up is detected before the lapse of the fixed duration, the filling function is disabled and the control unit 102 returns to the open-loop schedule at that time (see plot 204). For this purpose, upon receiving the light-up detection signal, the flow rate computation module 112 illustratively retrieves the open-loop schedule from the memory 104 and outputs a signal indicating that the fuel flow rate is to follow the retrieved open-loop schedule.

Whenever returning to the open-loop schedule, the flow rate computation module 112 illustratively computes a gradual step down in fuel flow to achieve a smooth transition. This gradual step down may be performed over a range of 3% of the gas generator speed (Ng). For instance, if the speed of the engine 10 had reached 10,000 rpm at light-up, the filling function is illustratively disabled and the fuel flow rate is gradually lowered towards the open-loop fuel flow rate over the range of speeds from 10,000 rpm to 10,000 rpm+3% of 10,000 rpm, i.e. 10,300 rpm. It should be understood that ranges other then 3% Ng may also be used.

The above is illustrated in plot 204, which shows that, upon the adaptive filling function being enabled, the boosted fuel flow rate computed by the flow rate computation module 112 is added to the predetermined open loop fuel schedule over the fixed duration. In particular, upon activation of the filling function, fuel is illustratively delivered to the fuel manifold 16 according to a flow rate equal to the sum of the boosted fuel flow rate (Wf) computed using equation (4) and a fuel flow rate determined by the open-loop schedule. Upon either light-up detection, and accordingly disablement of the filling function, or lapse of the fixed duration, the fuel manifold 16 may be filled according to the open-loop fuel flow rate only.

The fuel flow rate supplied to the fuel manifold 16 may further vary according to the starter torque. Indeed, during normal engine start, the compressor rotational speed is illustratively obtained through the use of a motive power source, such as an electrical or pneumatic starter (not shown) drivably coupled to the engine 10 and operated to produce rotation thereof. As the starter accelerates the engine 10, a fuel delivery pump and an igniter (not shown) may be actuated to effect ignition in the combustor 14. Upon successful ignition of the engine 10 and once the engine 10 has reached a self-sustaining speed, the starter may be disengaged. The starter torque may however vary, producing different engine core accelerations as shown in plot 202. Using the minimum allowable starter torque, lower acceleration may be achieved, and accordingly lower fuel flow rates may be supplied to the fuel manifold 16, as shown in the lower curves illustrated in plots 200, 202, and 204. Alternatively, using the maximum allowable starter torque, higher acceleration may be achieved, and accordingly higher fuel flow rates may be supplied, as shown in the lower curves illustrated in plots 200, 202, and 204.

It should be understood that the adaptive filling function implemented by the control unit 102 may not only adapt to starter torque variations but to other parameters as well. Indeed, various conditions may produce changes in the rotor acceleration. Such conditions include, but are not limited to, starter torque variations, NC forward speed in case of in-flight re-start of the engine 10, ambient air temperature, engine oil temperature, and aircraft battery depletion. For example, an increase in ambient air temperature or engine oil temperature can result in an increase in rotor acceleration. Also, a low battery may result in low starter torque, leading to low acceleration. By taking into account to the rotor acceleration, the adaptive filling function implemented by the control unit 102 can therefore adapt to these different conditions.

Figure 5A:
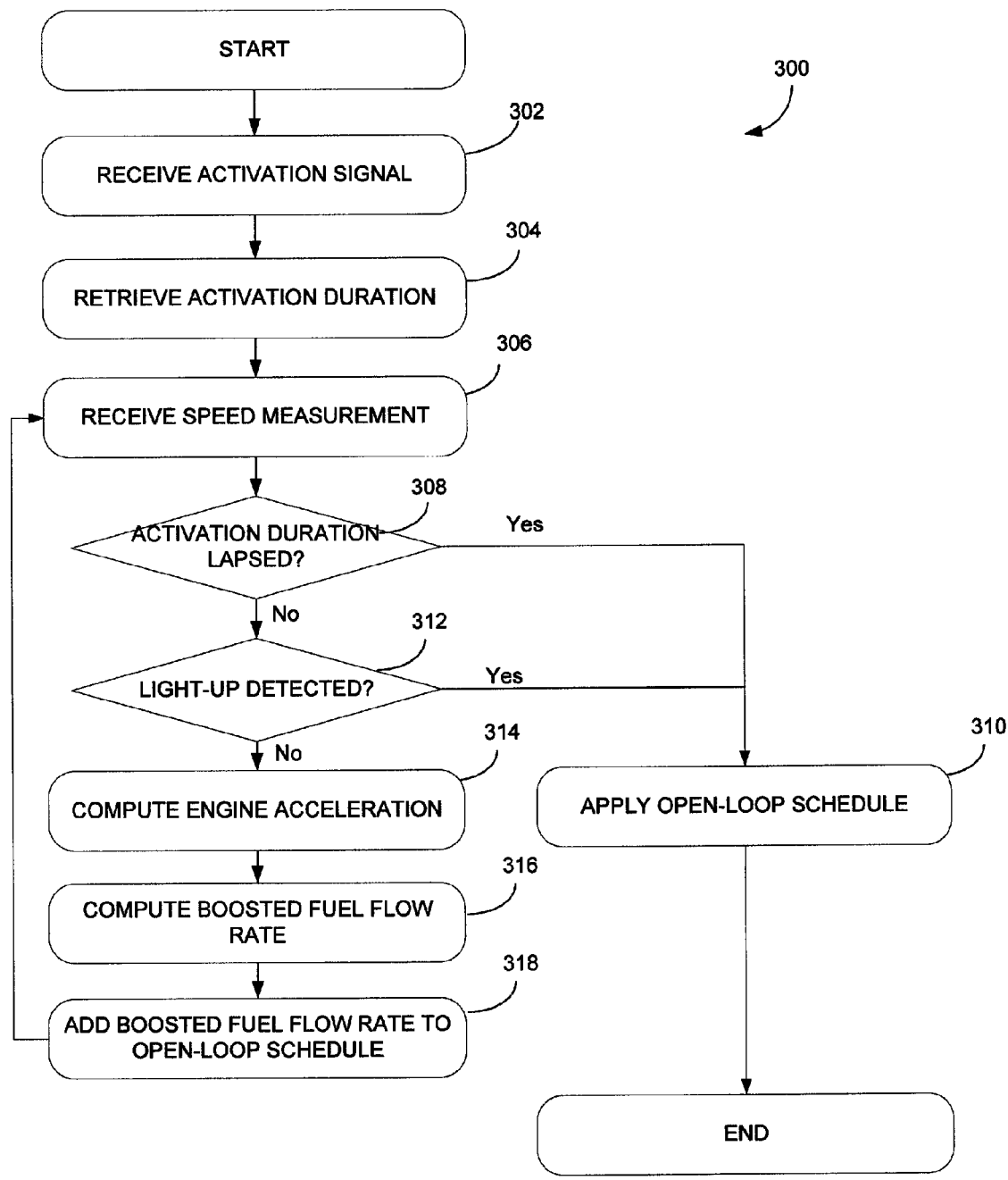
FIG. 5a is a flowchart of an adaptive fuel manifold filling method in accordance with an illustrative embodiment.

Referring to FIG. 5a, a method 300 for adaptively filling the fuel manifold 16 will now be described. The method 300 comprises receiving at step 302 an activation signal. The predetermined duration for which it is desired to activate the filling function may further be retrieved at step 304. A measurement of a speed of the engine 10 from the speed sensor 106 may then be received at step 306. Upon receiving the speed measurement, the method 300 may determine at step 308 whether the activation duration has lapsed. If this is the case, the open-loop schedule may be applied at step 310. Otherwise, the method 300 may determine at step 312 whether light-up of the engine 10 has been detected. If this is the case, the method 300 may flow to the step 310 of applying the open-loop schedule. Otherwise, the acceleration of the engine 10 may be computed at step 314 from the received speed measurement. The boosted fuel flow rate may further be computed at step 316 and added to the open-loop schedule at step 318 for filling the fuel manifold 16 accordingly, as discussed above. The method 300 may then flow back to the step 306 of receiving a speed measurement and the process may be repeated.

Figure 5B:
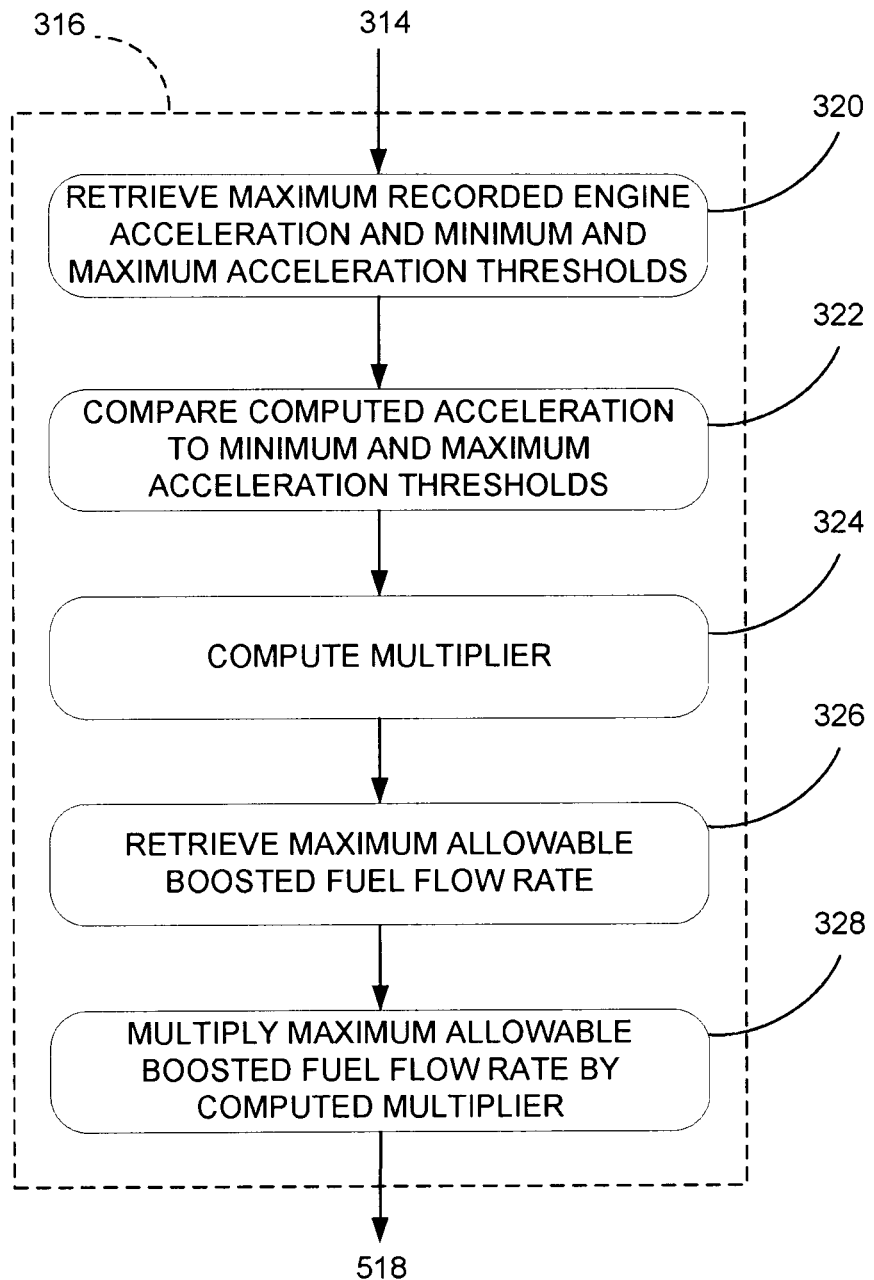
FIG. 5b is a flowchart of the step of FIG. 5a of computing a boosted fuel flow rate.

Referring to FIG. 5b, the step 316 of computing the boost fuel flow rate illustratively comprises retrieving at step 320 a maximum recorded engine acceleration (Max_N2 dot) and minimum and maximum acceleration thresholds (min_threshold and max_threshold). The step 316 further comprises comparing at step 322 the acceleration computed at step 314 to the thresholds retrieved at step 320. The multiplier (BWf) may then be computed at step 324 on the basis of the comparison result. In particular, step 324 illustratively comprises determining the multiplier according to equations (1), (2), and (3) discussed above. The step 316 may further comprise retrieving a maximum boosted fuel flow rate (max_boost_Wf_value) at step 326 and multiplying at step 328 the retrieved maximum boosted fuel flow rate by the multiplier computed at step 324. The multiplication performed at step 328 is illustratively effected according to equation (4) discussed above.

Figure 5C:
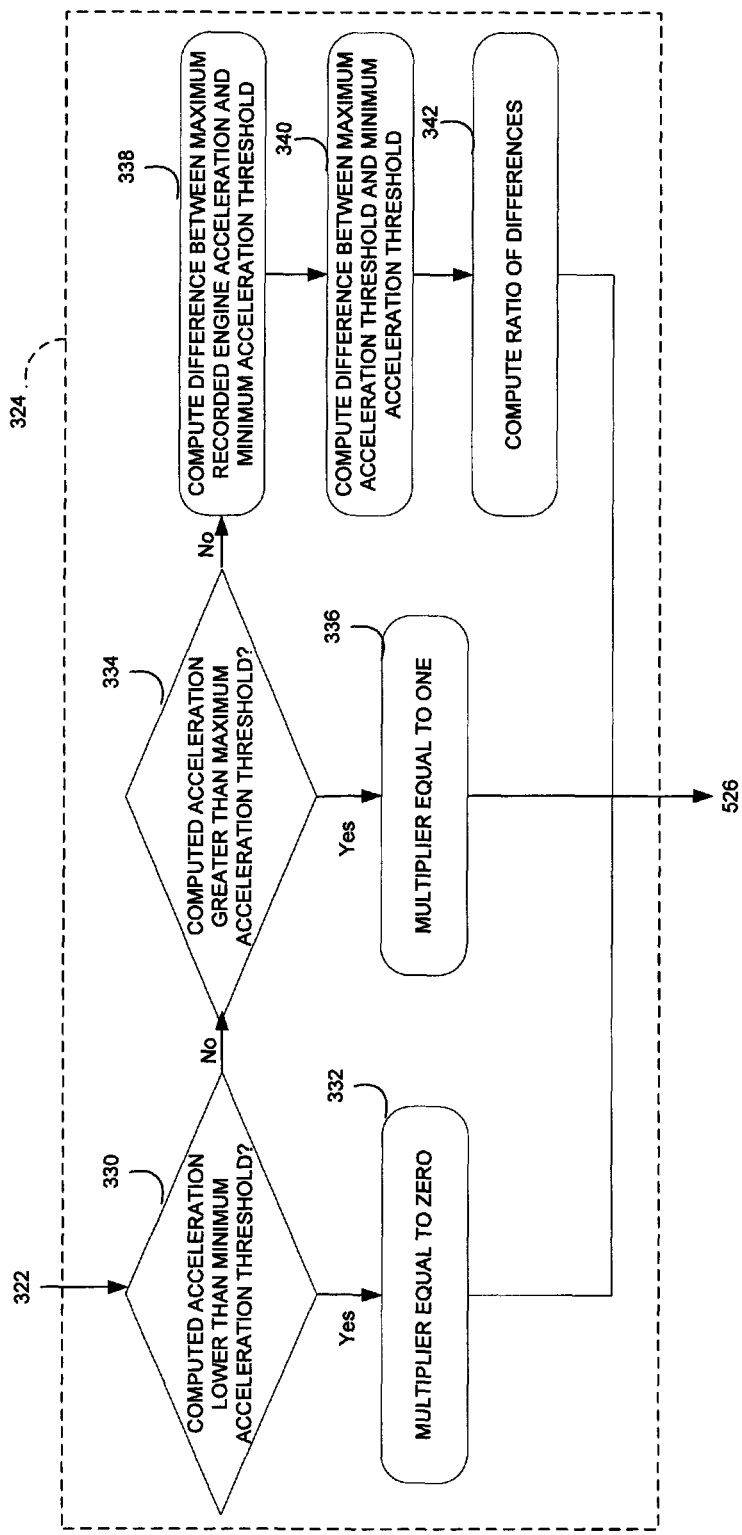
FIG. 5c is a flowchart of the step of FIG. 5b of computing a multiplier.

Referring to FIG. 5c, as discussed above with reference to equations (1), (2), and (3), the step 324 of computing the multiplier illustratively comprises determining at step 330 whether the acceleration computed at step 314 is lower than the minimum acceleration threshold. If this is the case, the method 300 flows to the step 332 of setting the multiplier to zero. Otherwise, the method 300 flows to the step 334 of determining whether the acceleration computed at step 314 is greater than the maximum acceleration threshold. If this is the case, the multiplier is set to one at step 336. Otherwise, the method computes at step 338 the difference between the maximum recorded engine acceleration and the minimum acceleration threshold, computes the difference between the maximum acceleration threshold and the minimum acceleration threshold at step 340, and computes at step 342 a ratio of the differences to determine a value of the multiplier.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A system for filling a fuel manifold of a gas turbine engine, the system comprising:
   a memory;
   a receiving unit adapted to receive an activation signal indicative of a requested start of the gas turbine engine and a present measurement of a speed of the gas turbine engine; and
   a processing unit coupled to the memory, the processing unit adapted to trigger, upon receipt of the activation signal, an adaptive filling function for the fuel manifold, to match a flow rate of fuel into the manifold with the speed of the gas turbine engine for engine light-up, the adaptive filling function comprising:
      computing from the received measurement the flow rate of fuel to be supplied to the fuel manifold for filling thereof prior to the gas turbine engine start; and
      generating an output signal for causing delivery of the fuel to the fuel manifold according to the computed flow rate.

2. The system of claim 1, wherein the memory has stored therein a minimum acceleration threshold and a maximum acceleration threshold and further wherein the processing unit is adapted to compute from the received measurement a present value of an acceleration of the engine, retrieve the minimum acceleration threshold and the maximum acceleration threshold from the memory, compare the present value of the acceleration to the retrieved minimum acceleration threshold and maximum acceleration threshold, and compute the flow rate according to a result of the comparison.

3. The system of claim 2, wherein the processing unit is adapted to compute the flow rate by computing a boosted fuel flow rate and adding the boosted fuel flow rate to a predetermined fuel flow rate, the predetermined fuel flow rate following an open-loop fuel flow schedule.

4. The system of claim 3, wherein the memory has stored therein a maximum allowable value for the boosted fuel flow rate and further wherein the processing unit is adapted to retrieve the maximum allowable value from the memory and to multiply the retrieved maximum allowable value by a multiplier to compute the boosted fuel flow rate.

5. The system of claim 4, wherein, if the result of the comparison indicates that the present value of the acceleration is lower than the minimum acceleration threshold, the processing unit sets the multiplier to be equal to zero and if the result of the comparison indicates that the present value of the acceleration is greater than the maximum acceleration threshold, the processing unit sets the multiplier to be equal to one.

6. The system of claim 5, wherein the memory has stored therein a plurality of previous values of the acceleration and further wherein the processing unit is adapted to search the memory for a maximum one of the plurality of previous values.

7. The system of claim 6, wherein, if the result of the comparison indicates that the present value of the acceleration is greater than the minimum acceleration threshold and lower than the maximum acceleration threshold, the processing unit computes a first difference between the maximum acceleration value and the minimum acceleration threshold, computes a second difference between the maximum acceleration threshold and the minimum acceleration threshold, computes a ratio of the first difference and the second difference, and sets the multiplier to be equal to the ratio.

8. The system of claim 3, wherein the processing unit is adapted to compute the flow rate by adding the boosted fuel flow rate to the predetermined fuel flow rate until a detection of a light-up of the engine.

9. The system of claim 8, wherein, upon the detection of the light-up, the processing unit is adapted to transition the flow rate towards the predetermined fuel flow rate.

10. A method for filling a fuel manifold of a gas turbine engine, the method comprising:
receiving an activation signal indicative of a requested start of the engine and a present measurement of a speed of the gas turbine engine; and
triggering, upon receipt of the activation signal, an adaptive filling function for the fuel manifold, to match a flow rate of fuel into the manifold with the speed of the gas turbine engine for engine light-up, the adaptive filling function comprising:
computing from the received measurement the flow rate of fuel to be supplied to the fuel manifold for filling thereof prior to gas turbine engine start; and
generating an output signal for causing delivery of the fuel to the fuel manifold according to the computed flow rate.

11. The method of claim 10, further comprising computing from the received measurement a present value of an acceleration of the engine, retrieving from a memory a minimum acceleration threshold and a maximum acceleration threshold, comparing the present value of the acceleration to the retrieved minimum acceleration threshold and maximum acceleration threshold, and computing the flow rate according to a result of the comparison.

12. The method of claim 11, wherein computing the flow rate comprises computing a boosted fuel flow rate and adding the boosted fuel flow rate to a predetermined fuel flow rate, the predetermined fuel flow rate following an open-loop fuel flow schedule.

13. The method of claim 12, wherein computing the boosted fuel flow rate comprises retrieving a maximum allowable value for the boosted fuel flow rate from the memory and multiplying the retrieved maximum allowable value by a multiplier.

14. The method of claim 13, wherein comparing the present value of the acceleration to the retrieved minimum acceleration threshold and maximum acceleration threshold comprises setting the multiplier to be equal to zero if the result of the comparison indicates that the present value of the acceleration is lower than the minimum acceleration threshold and setting the multiplier to be equal to one if the result of the comparison indicates that the present value of the acceleration is greater than the maximum acceleration threshold.

15. The method of claim 14, wherein comparing the present value of the acceleration to the retrieved minimum acceleration threshold and maximum acceleration threshold comprises searching for a maximum one of a plurality of previous values of the acceleration stored in the memory.

16. The method of claim 15, wherein comparing the present value of the acceleration to the retrieved minimum acceleration threshold and maximum acceleration threshold comprises, if the result of the comparison indicates that the present value of the acceleration is greater than the minimum acceleration threshold and lower than the maximum acceleration threshold, computing a first difference between the maximum acceleration value and the minimum acceleration threshold, computing a second difference between the maximum acceleration threshold and the minimum acceleration threshold, computing a ratio of the first difference and the second difference, and setting the multiplier to be equal to the ratio.

17. The method of claim 12, wherein computing the flow rate comprises computing a boosted fuel flow rate and adding the boosted fuel flow rate to the predetermined fuel flow rate until a detection of a light-up of the engine.

18. The method of claim 17, further comprising transitioning the flow rate towards the predetermined fuel flow rate upon the detection of the light-up of the engine.

19. A system for filling a fuel manifold of a gas turbine engine, the system comprising:
means for receiving an activation signal indicative of a requested start of the gas turbine engine and a present measurement of a speed of the gas turbine engine; and
means for triggering, upon receipt of the activation signal, an adaptive filling function for the fuel manifold, to match a flow rate of fuel into the manifold with the speed of the gas turbine engine for engine light-up, the adaptive filling function comprising:
computing from the received measurement the flow rate of fuel to be supplied to the fuel manifold for filling thereof prior to gas turbine engine start; and
generating an output signal for causing delivery of the fuel to the fuel manifold according to the computed flow rate.

* * * * *